United States Defensive Publication [19] (H) [11] T998,012

Bruce et al. [43] Sep. 2, 1980

[54] PROTECTION OF INSECT PHEROMONES FROM DEGRADATION BY ULTRAVIOLET RADIATION

[75] Inventors: William A. Bruce; Patrick T. M. Lum; Helen C. F. Su; Roy E. Bry; Robert Davis, all of Savannah, Ga.

[73] Assignee: The United States of America as represented by the Secretary of Agriculture, Washington, D.C.

[21] Appl. No.: 124,011

[22] Filed: Feb. 25, 1980

[51] Int. Cl.[3] ..... A01N 25/22

[52] U.S. Cl. ..... 424/174; 424/304; 424/308; 424/311

[57] ABSTRACT

A substituted benzene compound of the following formula was found to protect an insect pheromone against ultraviolet (UV) radiation degradation

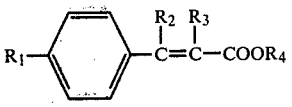

wherein $R_1$ is H or alkoxy group of 1 to 2 carbon atoms, $R_2$ is H or phenyl group, $R_3$ is H, CN, or methylcarboxy group, $R_4$ is alkyl group of 1 to 2 carbon atoms of straight chain or 2 to 6 carbon atoms with $\beta$-substitution of alkyl or alkoxy group of 1 to 2 carbon atoms or $\alpha$- and $\beta$-OH substitutions. The UV absorbing compounds of the preceding formula significantly extended the biological activity and quality of the pheromone while at the same time remaining nontoxic to the insect and nondestructive of the environment.

1 Claim, No Sheets Drawing,

9 Pages Specification

The file of this unexamined application may be inspected and copies thereof may be purchased (849 O.G. 1221, Apr. 9, 1968).